United States Patent [19]

Sizer, II

[11] Patent Number: 5,504,279
[45] Date of Patent: Apr. 2, 1996

[54] WIRELESS PEN TABLET

[75] Inventor: Theodore Sizer, II, Little Silver, N.J.

[73] Assignee: AT&T Corp., Murray Hill, N.J.

[21] Appl. No.: 364,332

[22] Filed: Dec. 27, 1994

[51] Int. Cl.⁶ .................................................. G08C 21/00
[52] U.S. Cl. ............................................ 178/19; 375/239
[58] Field of Search ......................... 178/18, 19, 87; 375/232, 239; 332/112; 329/313

[56] References Cited

U.S. PATENT DOCUMENTS

| 3,670,103 | 6/1972 | Baxter et al. | 178/19 |
| 4,886,911 | 12/1989 | Davis et al. | 178/18 |
| 5,113,041 | 5/1992 | Blonder et al. | 178/18 |
| 5,138,118 | 8/1992 | Russell | 178/19 |
| 5,908,351 | 4/1995 | Hucng | 375/239 X |

*Primary Examiner*—Stephen Chin
*Assistant Examiner*—Paul Loomis
*Attorney, Agent, or Firm*—John A. Caccuro

[57] ABSTRACT

A wireless communication apparatus sends X and Y coordinate position signals of a pen on a tablet using position modulation of three pulses, the time separation between the first and second pulses being proportional to the X position and the time spacing between the second and third pulses being proportional to the Y position. At a receiver, the three-pulse wireless signal is received and the X and Y coordinate information is determined therefrom.

13 Claims, 3 Drawing Sheets

500

WIRELESS PEN TABLET

TECHNICAL FIELD

This invention relates to wireless communication apparatus and, more particularly, to a wireless pen tablet for use in sending the pen's coordinate information on the tablet using wireless signals.

BACKGROUND OF THE INVENTION

Graphical tablets, including "touchscreen" tablets and pen-based tablets (hereinafter pen tablets) are becoming more commonplace for the entry of graphical information into a computer. Pen tablets are also being used to a greater degree as an input device for game apparatus and home intelligent devices. In such applications, the tether used to attach the pen tablet to the intelligent device is cumbersome and tends to restrict the use of such pen devices. On the other hand, existing wireless pen tablets use an unacceptable amount of battery power since the amount of data transmitted from the pen tablet is large.

SUMMARY OF THE INVENTION

In accordance with the present invention, a wireless communication apparatus is disclosed for sending the X and Y coordinate position signals of a pen on a tablet using position modulation of three pulses, the time separation between the first and second pulses being proportional to the X position and the time spacing between the second and third pulses being proportional to the Y position. By using three short radio or infrared pulses for the wireless transmission of X and Y position information, the battery lifetime is significantly enhanced.

BRIEF DESCRIPTION OF THE DRAWING

The foregoing advantages and features of the present invention are appreciated more fully from the following description, with reference to the accompanying drawings in which.

DETAILED DESCRIPTION

Figure 1:
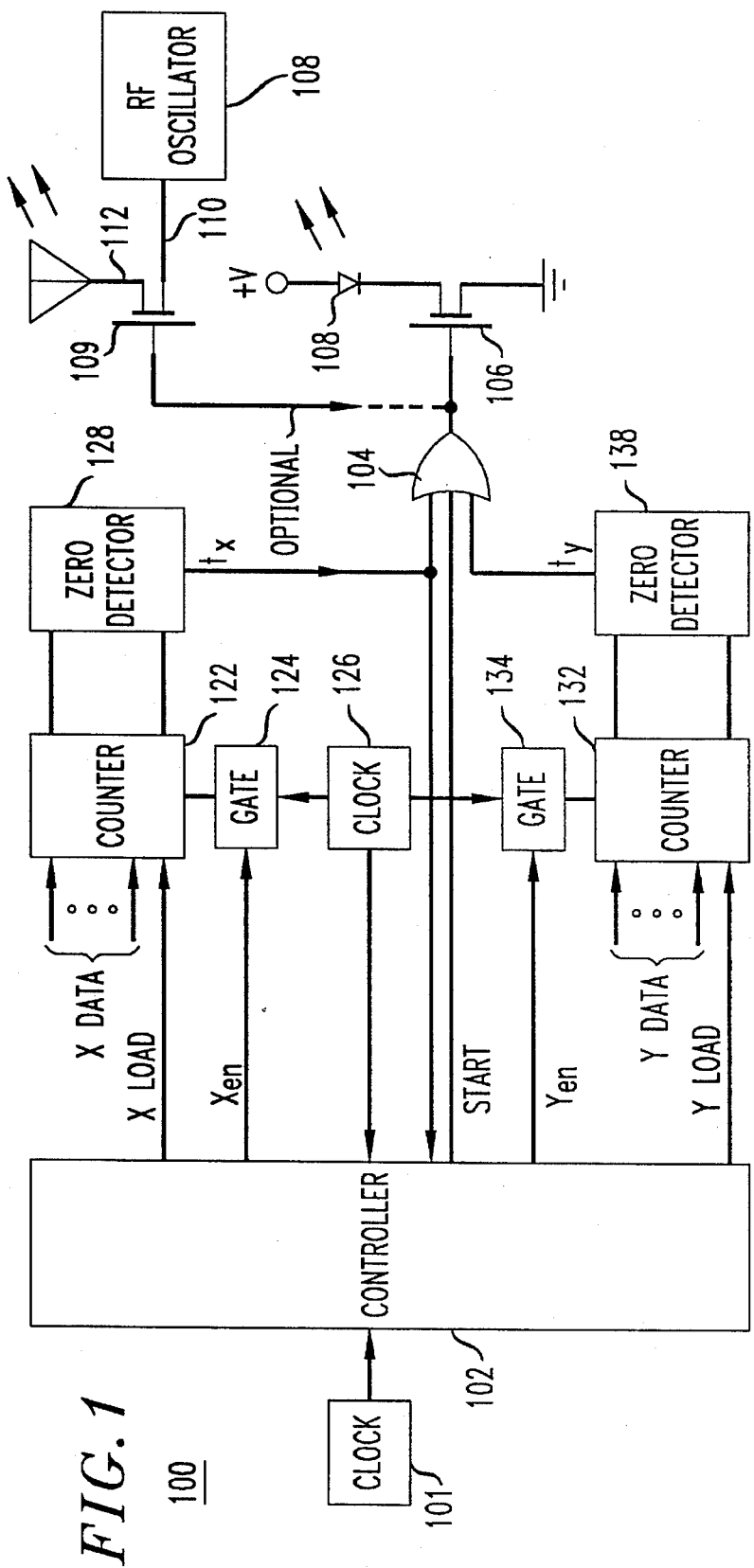
FIG. 1 is a schematic diagram of a wireless communication apparatus for sending multiple coordinate information signals using position modulation using a three-pulse wireless signal.

The present invention provides apparatus for a method of transmitting multiple coordinate location data using only three pulses. This apparatus provides a very efficient wireless data transmission technique for use in a wireless apparatus, e.g., a wireless pen tablet, to provide long battery life. A pen tablet (also known as a scribble pad) typically has a writing surface having a resolution of 1024 by 1024. To send the X and Y coordinate position of a pen on the writing surface requires 10 binary data bits to define each of the X and the Y positions. If the pen tablet operates at a refresh rate of 100 Hz, a transmission data rate of 2000 bps is required for the data link between the pen tablet and the receiver unit. Transmitting this data in a binary format incurs a large overhead. Since most pen tablets should be wireless to make them easier to use, this large data transmission overhead results in unacceptable battery drain on a wireless pen tablet.

The present invention teaches a data transmission technique that is very efficient and compatible with the X and Y coordinate information of prior art pen tablets. One such pen tablet is described in U.S. Pat. No. 5,113,041 issued on May 12, 1992 to G. E. Blonder and R. A. Boie and assigned to the same assignee as the present invention. According to the present invention, the X and Y coordinate information is sent using three pulses that are transmitted as a radio or infrared signal. These three pulses utilize pulse position modulation to encode the X and Y coordinate data.

To encode the X coordinate position, the transmitter transmits two pulses separated by a time period which is detectable at the receiver to one part in 1024. The two pulses utilized to send the X coordinate position include a frame start pulse $t_0$ and a second pulse $t_x$ separated by a time period proportional to the X coordinate position. To encode the Y coordinate position, a third pulse $t_y$ separated by a time period proportional to the Y coordinate position is transmitted. With brief reference to FIG. 2, there is shown the three pulses $t_0$, $t_x$ and $t_y$. Time period $t_x - t_0$ represents the X coordinate value and time period $t_{x+y} - t_x$ represents the Y coordinate value.

For an illustrative wireless pen tablet having 1024 by 1024 resolution and a refresh rate of 100 Hz, the time period between consecutive frame start pulses $t_0$ will be approximately 0.01 seconds. Consequently, the time increment representing each increment of the 1024 increments along the X coordinate is approximately 5 microseconds. Similarly, each increment along the Y coordinate would be represented by approximately 5 microseconds.

At the receiver location, these three pulses are received and the X coordinate value (position) is determined by subtracting the arrival time of the pulse $t_0$ from the arrival time of the pulse $t_x$. Similarly, the Y coordinate value is obtained by subtracting the arrival time of the pulse $t_x$ from the arrival time of the pulse $t_y$.

With reference to FIG. 1, we describe an illustrative embodiment of a wireless communication apparatus for sending multiple coordinate information signals. While the present invention will be described for use in a two-coordinate arrangement, the technique can more generally be applied to arrangements utilizing more than two coordinates. In FIG. 1, the X coordinate data is received by counter 122 and the Y coordinate data is received by counter 132 and the remainder of the circuitry of FIG. 1 generates the three pulses having pulse position time separation representative of the X and Y coordinate data. Controller 102 controls the operation of the wireless communication circuit of FIG. 1. Controller 102 uses clock 101, which operates at an illustrative 100 Hz rate, to generate the start pulses $t_0$ which occur every 0.01 seconds. The start pulse is gated by OR gate 104 to drive transistor 106 which controls the operation of infrared device 108 (e.g., an LED). Optionally, if radio pulse signals are to be utilized, then gate 104 would be connected to control switching transistor 109 which switches an RF oscillator 108 via path 110 to antenna 112.

Controller 102 causes counter 122 to load the X coordinate data using the signal X load. Thereafter controller 102 enables gate 124, using the enable signal $X_{en}$, to gate clock pulses from clock 126 to counter 122. Clock 126 operates at approximately 204.8 KHz. This enables 1024 clock pulses to be generated during the time period of the enable signal $X_{en}$. Counter 122 is a decrementing counter which decrements its count by one for each clock pulse received. Zero count detector 128 connects to counter 122, detects when the count reaches zero and then outputs a pulse signal $t_x$. The signal $t_x$ connects back to controller 102 and to an input of gate 104. The signal $t_x$ passes through the gate 104 and generates an infrared pulse via transistor 106 and infrared device 108 as previously described.

Controller 102 utilizes the signal $t_x$ to time the generation of the Y load signal and the $Y_{en}$ signal. The counter 132, in response to the Y load signal, loads the Y coordinate data. The $Y_{en}$ signal causes gate 134 to gate clock pulses from clock 126 to counter 132. The counter 132 is a decrementing counter which decrements its count (the Y coordinate data) using the clock pulses. The zero count detector 138 detects when the counter 132 equals zero and, in response, generates a pulse signal $t_y$. The signal $t_y$ is gated through gate 104 to transistor 106, causing an infrared pulse to be generated by infrared device 108.

Figure 2:
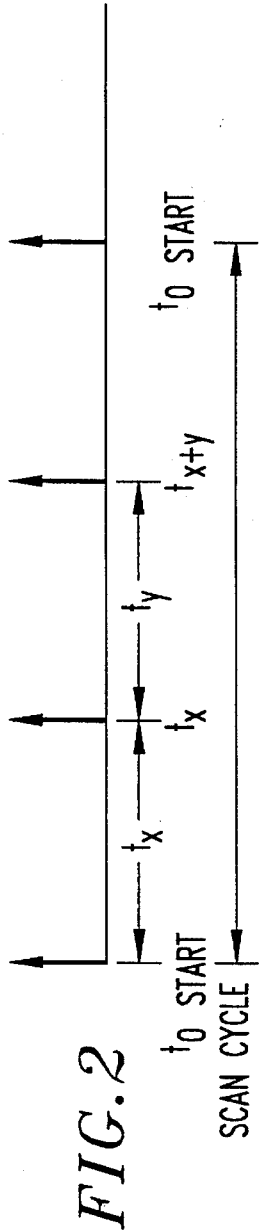
FIG. 2 illustrates a timing diagram showing a three-pulse wireless signal.

With reference to FIG. 2, there is shown the timing between the start pulse $t_0$, pulse $t_x$ and the pulse $t_{x+y}$. As shown, the scan cycle is the time between consecutive start pulses $t_0$, 0.01 seconds for an illustrative pen tablet having 100 Hz refresh rate. In FIG. 2, the X coordinate data is represented by the time $t_x-t_0$ and the Y coordinate data is represented by the time period $t_{x+y}-t_x$.

Figure 3:
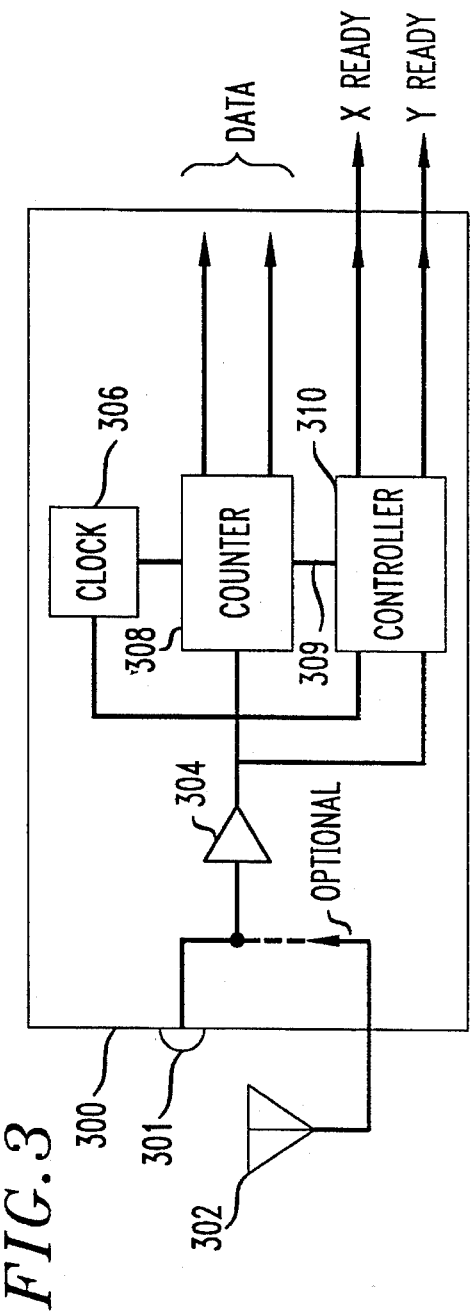
FIG. 3 illustrates a receiver for receiving a three-pulse wireless signal and converting it into multiple coordinate information signals.
Figure 4:
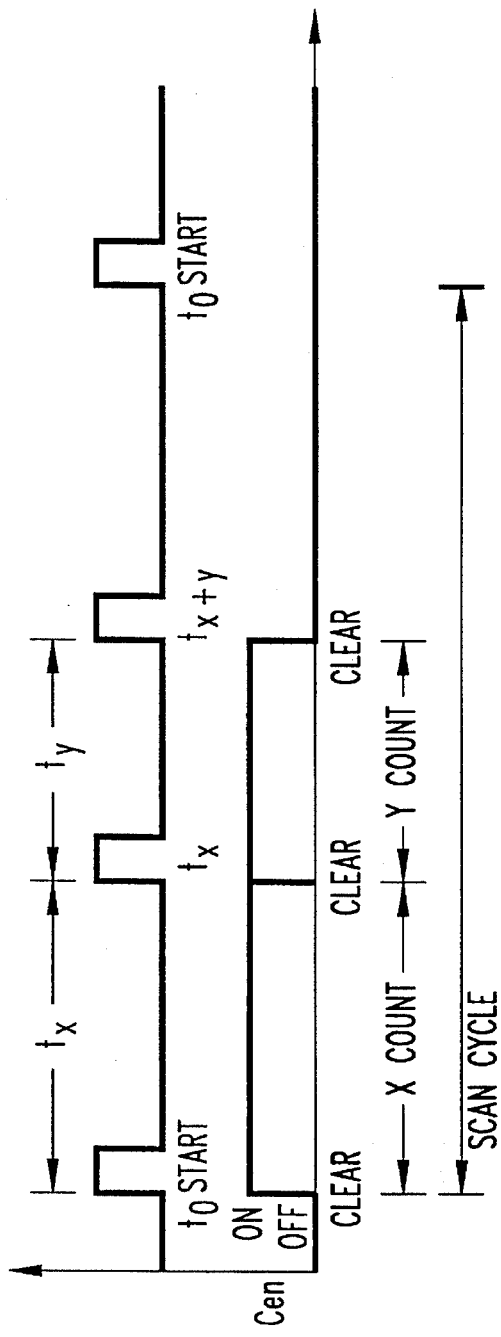
FIG. 4 is an illustrative timing diagram showing the recovery of the three-pulse wireless signal.

With reference to FIGS. 3 and 4, we describe the operation of an infrared receiver (or optionally a radio signal receiver). Infrared pulse signals are received by infrared detector 301 and amplified using amplifier 304. Optionally, radio pulse signals may be received using antenna 302 and amplified using amplifier 304. The output of amplifier 304 connects to counter 308 and to controller 310. A clock generator 306 connects to counter 308 and to controller 310. A clock generator 306 (like clock generator 126 of FIG. 1) also operates at 204.8 KHz. When the start pulse $t_0$ is received by controller 310, it generates a clock enable signal, $C_{en}$, (309) which enables counter 308 to start counting clock pulses from clock circuit 306 to determine the X coordinate data. When the pulse $t_x$ is received, controller 310 outputs the signal X ready, indicating that the X coordinate data has been determined and exists on the data leads of counter 308. The controller 310 then momentarily causes the signal $C_{en}$ to switch to the logic zero state (at time $t_x$) to clear counter 308. The X ready signal indicates that the data output of counter 308 is the X coordinate data. Thereafter signal $C_{en}$ returns to logic one, thereby enabling counter 308 to count clock pulses again to determine the Y coordinate data. When the third pulse is received at time $t_{x+y}$, controller 310 generates the Y ready signal, indicating that the Y coordinate data has been determined and exists on the data leads of counter 308.

With reference to FIG. 4, we illustrate the received three pulses at $t_0$, $t_x$, and $t_{x+y}$ received during a scan cycle and the counter 308 signal $C_{en}$.

Figure 5:
FIG. 5 illustratively shows an embodiment of the invention implemented as a wireless pen tablet.

With reference to FIG. 5, we illustrate a wireless pen tablet 500. The circuitry of FIG. 5 includes a stylus 504 and tablet coordinate matrix 501. The detector 503 detects the X-Y coordinate position of the stylus 504 on the tablet matrix 501. The X coordinate information is generated when detector 503 detects pulses sequentially applied to X leads 523 by X shift register 522. The Y coordinate information is generated when detector 503 detects pulses sequentially applied to Y leads 533 by Y shift register 532. The operation of tablet matrix 501, detector 503 and shift registers 522 and 532 may, illustratively, operate in essentially the same manner as described in the previously identified U.S. Pat. No. 5,113,041 which is incorporated by reference herein. More particularly, the detector 503 includes the amplifier 30, capacitor 436, filter 39, and zero crossing detector 32 of FIG. 3 of the referenced patent. The operation of shift registers 522 and 532 is essentially the same as that described by circuit components 36 and 38, respectively, of the referenced patent.

When a user presses stylus 504 against matrix 501, detector 503 first generates a signal, in the manner described in the previously referenced patent, which is outputted to controller 502. The controller 502 generates the start pulse $t_0$ which is outputted through gate 104, transistor 106 and infrared device 108 as previously described in the description of FIG. 1. Controller 502 also outputs the start pulse $t_0$ to register 522 and enables gate 124, using signal $X_{en}$, to gate clock pulses to register 522. These clock pulses cause X register 522 to apply a pulse sequentially from left to right over X leads 523. When detector 503 detects the pulse, the X coordinate position pulse $t'_x$ is generated and sent to controller 502. Controller 502 then generates the pulse $t_x$ which is outputted through gate 104 and causes transistor 106 to generate an infrared pulse using infrared device 108. The pulse signal $t_x$ is also inputted to Y register 532. Controller 502 enables gate 134, using signal $Y_{en}$, to gate clock pulses to register 532. These clock pulses cause register 532 to apply a pulse sequentially from bottom to top over the Y leads 533. When detector 503 detects the pulse, the Y coordinate position pulse $t'_y$ is generated and sent to controller 502. Controller 502 then generates the pulse $t_y$ which is gated through gate 104, causing transistor 106 to momentarily pulse infrared device 108 "on" to generate an infrared pulse. The resulting three transmitted infrared pulses have the timing shown in FIG. 2, namely $t_0$, $t_x$ and $t_{x+y}$.

If desirable, the start pulse $t_0$ can be made distinguishable (e.g., wider, different frequency, double pulse, etc.) from the $t_x$ and $t_{x+y}$ signals to facilitate the detection of the beginning of the scan cycle.

It should also be noted that the pen tablet circuitry for encoding the X-Y coordinates may utilize other well-known techniques. Moreover, the controller can be implemented as a microprocessor or as a custom integrated circuit, each of which may also incorporate some of the other circuit functions of the circuitry shown.

What has been described is merely illustrative of the principles of the present invention. Other arrangements and methods can be implemented by those skilled in the art without departing from the spirit and scope of the present invention.

I claim:

1. Wireless transmitter apparatus for sending multiple coordinate information signals, comprising means for receiving multiple coordinate data including first and second coordinate signals and generating means, responsive to received first and second coordinate signals, for generating a three-pulse wireless signal including a first pulse as a start pulse, a second pulse separated from said start pulse by a time proportional to the first coordinate signal, and a third pulse separated from said second pulse by a time proportional to the second coordinate signal.

2. The apparatus of claim 1 further including a first means for generating and outputting the first coordinate signal to said receiving means and a second means for generating and outputting the second coordinate signal to said receiving means.

3. The apparatus of claim 1 wherein the generating means includes a clock signal means, means for generating said start pulse, means, responsive to said start pulse and the clock signal, for converting the first coordinate signal to said second pulse, means, responsive to said first coordinate signal and the clock signal, for converting the second coordinate signal to said third pulse.

4. The apparatus of claim 1 including a tablet coordinate matrix, responsive to a touching thereon by a stylus, for generating the first and second coordinate signals for output to said receiving means.

5. The apparatus of claim 1 wherein the wireless signal is a radio signal.

6. The apparatus of claim 1 wherein the wireless signal is an infrared signal.

7. Wireless receiver apparatus, comprising means for receiving a three-pulse wireless signal including a first pulse as a start pulse, a second pulse separated from said start pulse by a time proportional to a first coordinate signal, and a third pulse separated from said second pulse by a time proportional to a second coordinate signal, and means, responsive to a received three-pulse wireless signal, for determining therefrom the first and second coordinate signals.

8. The apparatus of claim 7 wherein the determining means includes a clock for generating clock pulses, a counter, and a controller, responsive to the first pulse, for enabling the counter to count clock pulses to generate a first count indicative of the first coordinate signal and, responsive to the second pulse, for enabling the counter to count clock pulses to generate a second count indicative of the second coordinate signal.

9. The apparatus of claim 7 wherein the three-pulse wireless signal is a radio signal.

10. The apparatus of claim 7 wherein the three-pulse wireless signal is an infrared signal.

11. Wireless communication system for communicating multiple coordinate information signals, comprising at a transmitter, means for receiving multiple coordinate data including a first and second coordinate signals for defining a coordinate position and generating means, responsive to the first and second coordinate signals, for generating a three-pulse wireless signal including a first pulse as a start pulse, a second pulse separated from said start pulse by a time proportional to the first coordinate signal, and a third pulse separated from said second pulse by a time proportional to the second coordinate signal; and at a receiver, means for receiving the three-pulse wireless signal and means, responsive to a received three-pulse wireless signal, for determining therefrom the first and second coordinate signals.

12. A method of operating a wirless transmitter apparatus for sending multiple coordinate information signals, comprising the steps of receiving multiple coordinate data including first and second coordinate signals and generating, in response to a received first and second coordinate signals, a three-pulse wireless signal including a first pulse as a start pule, a second pulse separated from said start pulse by a time proportional to the first coordinate signal, and a third pulse separated from said second pulse by a time proportional to the second coordinate signal.

13. A method of operating a wireless receiver apparatus, comprising the steps of receiving a three-pulse wireless signal including a first pulse as a start pulse, a second pulse separated from said start pulse by a time proportional to a first coordinate signal, and third pulse separated from said second pulse by a time proportional to a second coordinate signal and determining the first and second coordinate signals from the received three-pulse wireless signal.

\* \* \* \* \*